(12) United States Patent
Kamata

(10) Patent No.: US 6,718,343 B2
(45) Date of Patent: Apr. 6, 2004

(54) RECYCLE MANAGING SYSTEM AND RECYCLE MANAGING METHOD

(75) Inventor: Tatsuya Kamata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 09/758,429

(22) Filed: Jan. 12, 2001

(65) Prior Publication Data

US 2002/0059298 A1 May 16, 2002

(30) Foreign Application Priority Data

Jul. 11, 2000 (JP) ........................................ 2000-209552

(51) Int. Cl.⁷ ............................................. G06F 17/30
(52) U.S. Cl. ...................... 707/104.1; 707/10; 707/200; 706/46; 705/14; 705/28
(58) Field of Search ............................. 707/10, 104.1; 705/14, 16, 37, 26, 4, 7–10, 30; 235/385; 706/46; 700/97

(56) References Cited

U.S. PATENT DOCUMENTS

| | | | | |
|---|---|---|---|---|
| 4,667,291 A | * | 5/1987 | Weitzman et al. | 705/1 |
| 4,829,428 A | * | 5/1989 | Weitzman et al. | 705/28 |
| 4,949,256 A | * | 8/1990 | Humble | 705/14 |
| 5,809,212 A | * | 9/1998 | Shasha | 706/46 |
| 5,923,016 A | * | 7/1999 | Fredregill et al. | 235/380 |
| 5,950,169 A | * | 9/1999 | Borghesi et al. | 705/4 |
| 5,965,858 A | * | 10/1999 | Suzuki et al. | 235/375 |
| 6,029,851 A | * | 2/2000 | Jenkins et al. | 221/102 |
| 6,178,408 B1 | * | 1/2001 | Copple et al. | 705/14 |
| 6,246,997 B1 | * | 6/2001 | Cybul et al. | 705/27 |
| 6,529,788 B1 | * | 3/2003 | Tani et al. | 700/97 |

FOREIGN PATENT DOCUMENTS

| | | |
|---|---|---|
| JP | 5-67274 | 3/1993 |
| JP | 5-128372 | 5/1993 |
| JP | 5-174254 | 7/1993 |

OTHER PUBLICATIONS

Klausner, Markus et al., "Integrating Product Takeback and Technical Service", Proceedings of the 1999 IEEE International Symposium on Electronics and the Environment, May 11, 1999, pp. 48–53.*

Nakada, Masakazu, "Construction of recycle system of toner cartridges", Proceeding of First International Symposium on Environmentally Conscious Design and Inverse Manufacturing. EcoDesign 1999. Feb. 2, 1999, pp. 300–303.*

* cited by examiner

*Primary Examiner*—Shahid Alam
(74) *Attorney, Agent, or Firm*—Westerman, Hattori, Daniels & Adrian, LLP

(57) ABSTRACT

A recycle managing system manages the payers and recycle points allocated to each payer in the case where the expenses for the recycle points restored to the consumers in response to returns of the recycle targeting goods are beard by the parties other than the retail stores. Thus, it becomes possible to manage the recycling activities by the three parties of the consumers, retail stores, and suppliers which enlarge the recycling activities between the conventional consumers and retail stores.

9 Claims, 7 Drawing Sheets

FIG. 4

Goods Data Base

| Goods Code | Goods Name | Unit Price | ... | Recycle Target | Recycle Point Ratio | Recycle Payer |
|---|---|---|---|---|---|---|
| 00000001 | Goods A | 1,000 | | N | | |
| 00000002 | Goods B | 2,000 | | Y | 1.0 | 0 |
| 00000003 | Goods C | 3,000 | | Y | 1.0 | 1 |
| 00000004 | Goods D | 4,000 | | Y | 1.0 | 2 |
| | | | | | | |

FIG. 5

Customer Data Base

| Customer Code | Customer Name | ............ | General Point | Recycle Point | Sum Point |
|---|---|---|---|---|---|
| 0000001 | CustomerA | | 100 | 10 | 110 |
| 0000002 | CustomerB | | 200 | 20 | 220 |
| 0000003 | CustomerC | | 300 | 30 | 330 |
| 0000004 | CustomerD | | 400 | 40 | 440 |
| | | | | | |

FIG. 7

```
                        Receipt

○ × Store
              Tokyo Chiyoda-ku ○-○-○
              TEL○○—×××—△△△△

Sales Clark
0001      Fujitsu Hanako                2000-1-5 14:00

Customer
Code No.    0000001         Name A

12345671  MO                                    @500
                    3                         ¥1,500
12345672  Printer Ribbon                        @250
                    2                           ¥500
12345673  Cleaner                               @230
                    1                           ¥230
                        Total                 ¥2,230

Consumption Tax      5%           ¥112
                        Total with Tax        ¥2,342
          Deposit                             ¥3,000
          Change                                ¥658

00000001  Monitor          Recycle Point        @500
                    1                            500

Previous Total Point               210
              General Point                       23
              Recycle Point                      500
              New Total Point                    733

Thank you for shopping
```

Payer Data Base

| Payer Code | Name | Goods Code | Number of Pieces | ... | Recycle Point | Total |
|---|---|---|---|---|---|---|
| 00000001 | Supplier A | 00000001 | 100 | | 200 | 200 |
| | | 00000002 | 0 | | 0 | |
| 00000002 | Supplier B | 00000003 | 15 | | 150 | 300 |
| | | 00000004 | 50 | | 150 | |
| | | | | | | |

|  | 1999.12.1 ~1999.12.31 | | | | |
|---|---|---|---|---|---|
| Goods | Unit Price | Recycle Point Ratio | Number of Pieces | Recycle Point | Recycle Expenses |
| Goods A | ¥2,000 | 0.1 | 100 | 200 | ¥200 |
| Transportation expenses etc |  |  |  |  | ¥1,000 |
| Total |  |  |  |  | ¥1,200 |

RECYCLE MANAGING SYSTEM AND RECYCLE MANAGING METHOD

BACKGROUND OF THE INVENTION

1. Field of the Invention

The present invention relates generally to a recycle managing system for managing recycle targeting goods to be returned from a customer to a retail store for a recycle, and more particularly, to a recycle managing system functioning also as a POS (point of sale) system.

2. Description of the Related Arts

With growing interest in an environmental protection, recycling activities become lively. As one example of the recycling activities, retail stores collect used containers for drinking water (PET bottles or the like), or recycle goods such as trays, packs, or the like, and provide stamp services, points restorable services, or the like for a customer.

In the stamp services, the retail store stamps a stamp card hand-held by a customer each time the customer carries in recycle goods. When reaching the predetermined number of stamps, the customer can enjoy services corresponding to the money or price.

On the other hand, in the case of the point restorable services, the retail store issues a point card to each customer, and each time the customer carries in recycle goods, the retail store restores points to the customer's point card. The customer's points are managed by the POS system introduced by the retail store. For example, when purchasing goods at the next time, etc., the customer can enjoy discount services in response to the points, or services having a monetary value in response to the points.

The retail stores conventionally bear the expenses to the services for such recycling activities.

On the other hand, the recycling activities which are carried out only between consumers and the retail stores as described above have a limit in the activities contents. Then, in order to accelerate more the recycling activities, in recent years, participation and cooperation of a supplier (containing a wholesaler and a manufacturer) in the recycling activities are being requested. Namely, the supplier bears the expenses to customer services such as points restoration, or the like, and further needs to take over the collected recycle targeting goods.

However, the conventional POS system for managing the recycling activities between the customers and retail stores cannot correspond to management of the above recycling activities which are carried out among the consumers, retail stores, and suppliers.

SUMMARY OF THE INVENTION

It is therefore the object of the present invention to provide a recycle managing system and a recycle managing method which are carried out among the consumers, retail stores, and suppliers.

In order to solve the above-mentioned object, in the recycle managing system of the present invention, in the case where the recycle points restored to the consumers in response to returns of the recycle targeting goods are beard by the parties other than the retail stores, the payers and recycle points allocated to each payer are managed. Thus, it becomes possible to manage the recycling activities by the three parties of the consumers, retail stores, and suppliers which enlarge the recycling activities between the conventional consumers and retail stores.

In order to attain the above object, according to a first aspect of the present invention there is provided a recycle managing system comprising: A recycle managing system for managing recycle targeting goods to be returned from customers, comprising:

a database recording information for discriminating whether or not goods are the recycle targeting ones, and information of payers paying expense of the recycle targeting goods; and a controller for referring to the database and for totaling the expense of the payers corresponding to the recycle targeting goods returned from the customers.

In order to attain the above object, according to a second aspect of the present invention there is provided a recycle managing system for managing recycle targeting goods which are returned from customers to retail stores for a recycle, comprising:

a calculator for calculating recycle points equivalent to a monetary value with respect to returns of the recycle targeting goods;

a customer database for managing the recycle points of each customer of the retail store;

a payer database for managing the recycle points of each payer other than the retail store, which pays expenses equivalent to the recycle points; and a renewing unit for renewing the recycle points of the customer returning the recycle targeting goods based on the calculated recycle points in the customer database, and further renewing the recycle points of the payer paying the expenses for the recycle points of the returned recycle targeting goods based on the calculated recycle points in the payer database.

Preferably, the recycle managing system of the present invention is a POS system which is introduced into the retail store.

BRIEF DESCRIPTION OF THE DRAWINGS

FIG. 4 is an example of a goods database;

FIG. 5 is an example of a customer database;

FIG. 7 is an example of a receipt according to the embodiment of the present invention;

DESCRIPTION OF THE PREFERRED EMBODIMENTS

Hereinafter, the embodiments of the present invention will be explained. However, a technological scope of the present invention is not limited to this embodiment.

Figure 1:
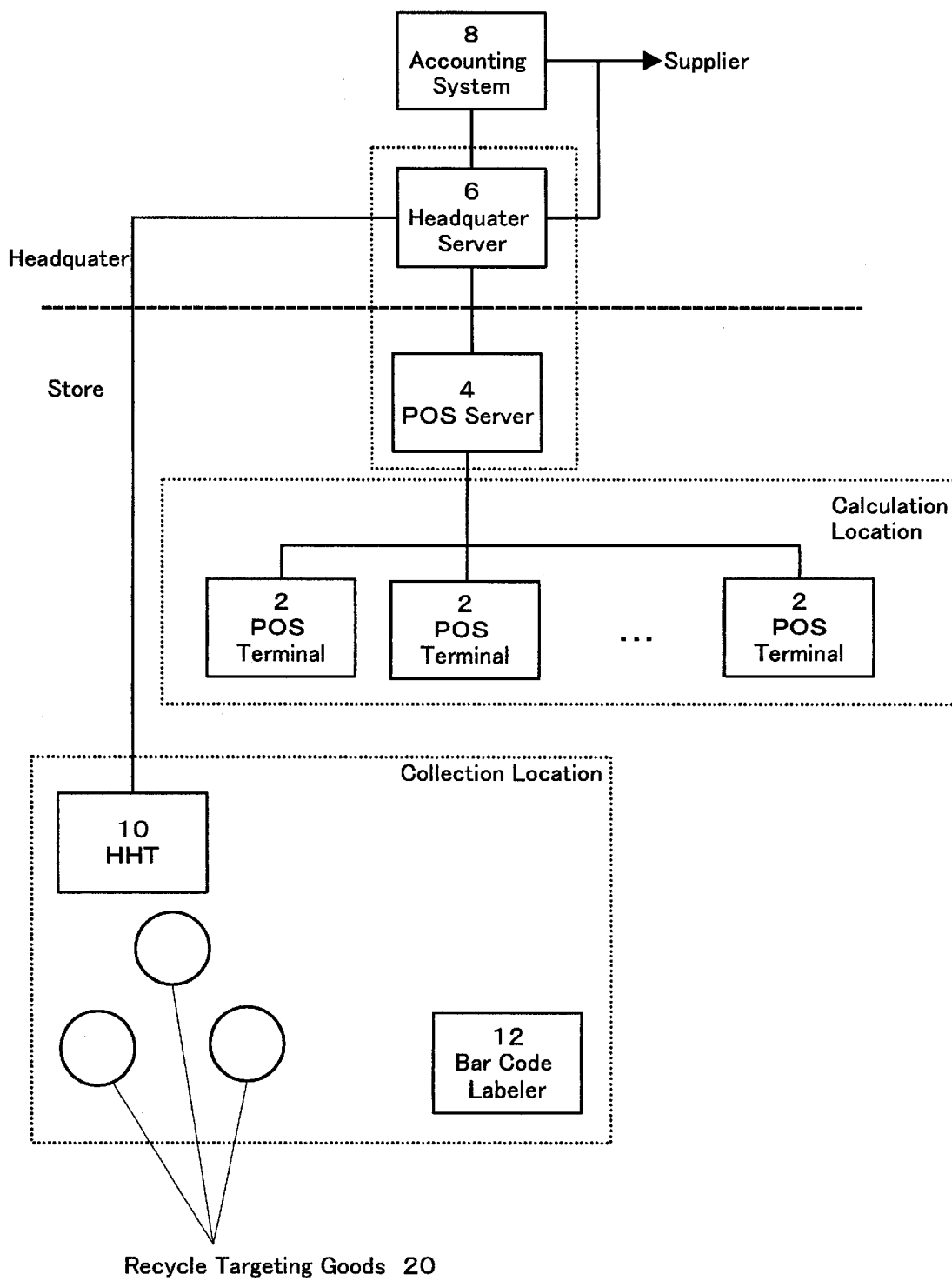
FIG. 1 is a diagram showing an example of the configuration of a recycle managing system according to the embodiment of the present invention.

FIG. 1 is a diagram for explaining an outline of the embodiment of the present invention, and is a diagram showing a configuration example of a POS (point of sale) system as a recycle managing system. In FIG. 1, a retail store has headquarters and stores, and goods are sold in the stores. A goods prices retrieval processing and a sales totaling processing are mainly performed when the goods are normally purchased between each of a plurality of POS terminals 2 in the stores and a goods server 4.

Figure 2:
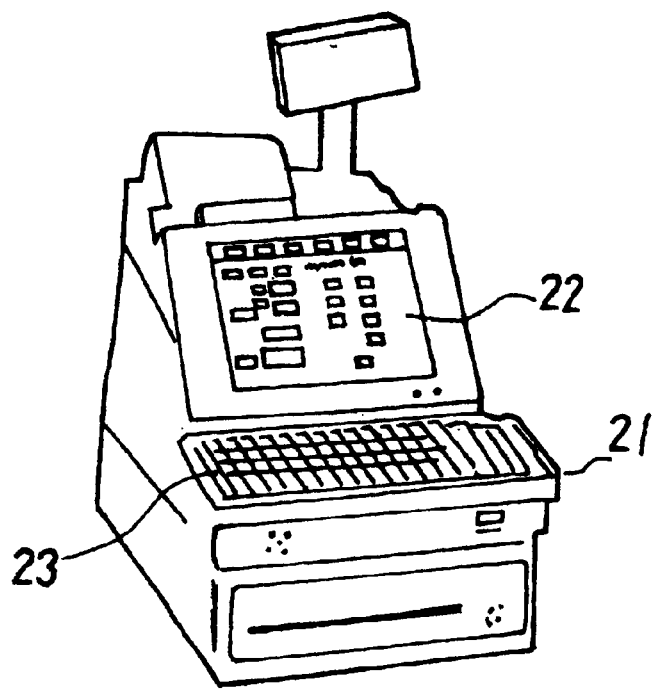
FIG. 2 is a diagram showing an example of an external appearance configuration of a POS terminal.

FIG. 2 is a diagram showing an example of an external appearance configuration of the POS terminal 2. The POS terminal 2 comprises a bar code reader 21, a display part 22, and a key board 23, and the bar code reader 21 reads a bar code of each of the goods in which a consumer desires to purchase (or a goods code is input from the key board), and acquires a goods price in response to the goods code from the server 4. The goods server 4 has a goods database storing the goods code and price, and notices the price in response to the goods code to the POS terminal 2, in response to a demand from the POS terminal 2. Furthermore, the goods server 4 totals sales data from each POS terminal 2 and transmits them to a headquarters server 6.

Furthermore, the headquarters are provided with the headquarters server 6 having a goods managing function for managing a sales at retail stores, a stock of each of goods, orders and deliveries for the suppliers, and the like, and a customer managing function for managing names of consumers registered as customers, dealing histories, and the like; and an accounting system 8 for processing claims, payments, and the like for the suppliers. Incidentally, the headquarters may be established within the store.

Furthermore, in order to realize the customer managing function of the headquarters server 6, the retail store, for example, issues a point card storing a customer code for each consumer. The headquarters server 6 has a customer database, and reads a magnetic tape or a bar code included in the point card at the POS terminal 2, thereby judging the customer code, and managing the points in response to purchasing histories or purchasing sums of the corresponding customers.

With reference to FIG. 1, an outline of the embodiment of the present invention will be explained.

The consumer calculates recycle targeting goods at calculation locations (so-called cash registers) where the POS terminal 2 is installed within the store, and purchases them. After the purchased recycle targeting goods are used, the consumer returns them to the retail store. At this time, as described below, there are two cases where the consumer carries in the recycle targeting goods to the cash register of the store, and carries in them to collection locations which have been in advance installed within the store, or in the vicinity of the store.

The retail store takes over the recycle targeting goods returned. As described above, the consumer are registered in the retail store as a customer, and has a card having a customer discriminating function such as the so-called point card issued by the retail store.

The consumer is judged by the point card, and the cycle points in response to a predetermined value of the carried-in recycle targeting goods are calculated, to restore to the consumer. The recycle points restored to the customers are stored by the headquarters server 6, and also may be stored in the point card. Furthermore, the recycle targeting goods collected at the calculation locations are transported to the collection locations, and are temporarily taken custody therein.

In the case where the recycle targeting goods are carried in to the calculation locations, as a salesclerk is always at the calculation location, the salesclerk takes over the recycle targeting goods when carried in, and calculates recycle points by using the POS terminal 2. On the other hand, in the case where the consumer carries in the recycle targeting goods to the collection locations, as the salesclerk is not necessarily permanently stationed at the collection location, in order to specify a person who carried in the recycle targeting goods, the consumer, for example, pastes a label printing an own customer's code which is registered in the headquarters server 6 on the recycle targeting goods. Preferably, the label is issued by a bar code label issuer (bar code labeler) 12 installed at the collection location. The bar code labeler 12 is a printer which acquires the customer code from the point code, and issues a label printing the bar code of the acquired customer code. Furthermore, in compliance with the retail store, a plurality of labels have been beforehand widely distributed to each consumer, and may be utilized.

When the salesclerk circulates in the collection location later, the pasted label is read by a portable terminal (handheld terminal, hereinafter referred to as HHT) 8 with a bar code scanner which the salesclerk brought, whereby the consumer carrying in the recycle targeting goods can be specified.

Figure 3:
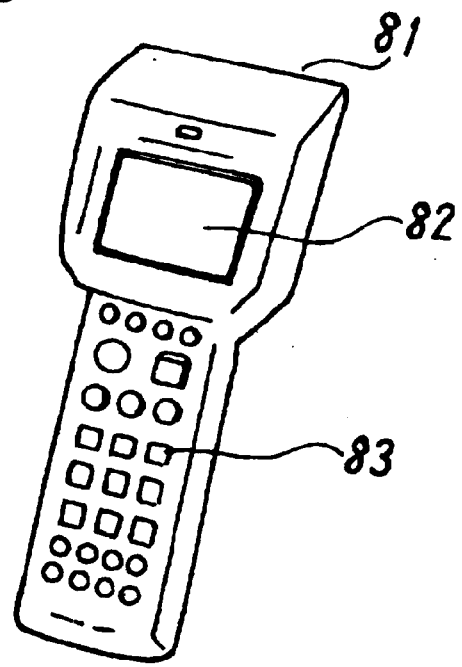
FIG. 3 shows by way of example a configuration of the external appearance of a hand-held terminal (HHT)

FIG. 3 shows an example of the configuration of an external appearance of the HHT. The HHT 8 comprises a bar code scanner 81, a display unit 82, and a ten key 83. The HHT 8 calculates recycle points from the goods code of the recycle targeting goods, and temporarily holds the calculation results. The HHT 8 has a connection connector (not shown), and transmits the calculation results to the headquarters server 6 in a condition of being capable of communicating with the headquarters server 6. Accordingly, the HHT 8 is also one of the POS terminals.

Furthermore, according to the embodiment of the present invention, in each of the recycle targeting goods, an payer (hereinafter referred to as a recycle payer) of the expenses for the recycle points to be restored to the consumers is also established in other than retail stores (suppliers, etc.). Accordingly, the salesclerk examines the recycle payer by utilizing the HHT 8 in each of the recycle targeting goods which are taken custody in the collection locations, and in the case where the payer is a supplier or the like, in order to charge the amount of money in proportion to the recycle points to the supplier, the salesclerk notifies the accounting system 8 of necessary information. The accounting system 8 of the headquarters issues a bill for the amount of money in proportion to the recycle points.

Furthermore, in the case where the supplier collects the recycle targeting goods, the salesclerk makes a collection order for the supplier. It is efficient to make the collection order together with orders of goods, or delivery confirmation.

In this manner, according to the embodiment of the present invention, the retail store restores the recycle points to the consumer which returns the recycle targeting goods, and simultaneously can make the amount of money in proportion to the recycle points to bear the party other than the retail store such as a supplier or the like. Accordingly, the three parties of the consumer, retail store, and supplier cooperates with each other, and can promote the recycle activities.

Hereinafter, the embodiment of the present invention will be explained specifically.

FIG. 4 is an example of a goods database according to the embodiment of the present invention. The goods database registers a goods code, a unit price, a goods name, or the like in each of the goods, and additionally whether or not the goods are a recycle target, and information of a recycle point ratio, and a recycle payer in the recycle targeting goods. For example, as the recycle point ratio of the goods B of the goods code "00000002" is 0.1%, in a piece of the goods B, $$3000 \times 0.1\% = 20 \text{ points}$$

is restored to the customer as the recycle points.

Furthermore, the recycle payers are assorted into, for example, a retail store itself, a supplier (containing a manufacturer), and the others (for example, a public office).

FIG. 5 is an example of the customer database according to the embodiment of the present invention. The customer database registers a customer code number, a customer name, a general point, and additionally a recycle point in each customer. The general point (hereinafter in some cases solely referred to as a point) is a point to be restored to the normal goods purchase sum. The general point and recycle point may be managed as the same point.

Figure 6:
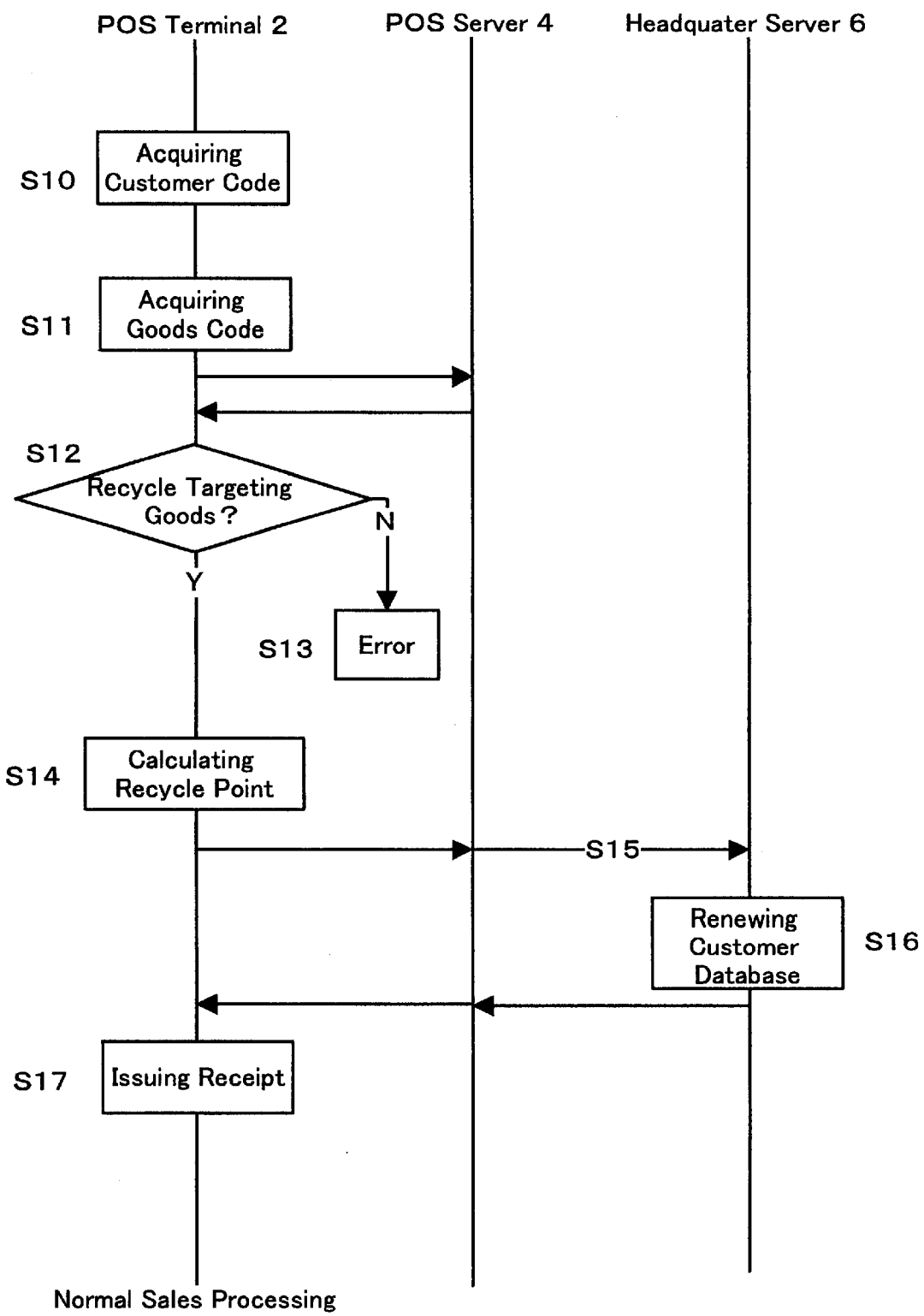
FIG. 6 is an example of a recycle points calculation processing.

FIG. 6 is an example of a recycle points calculation processing. It is assumed that a customer carries in the recycle goods to a calculation location in a store where the POS terminal is disposed. The POS terminal comprises a recycle processing key, and the salesclerk depresses the key, so that the POS terminal is switched from a normal sales processing mode to a recycle processing mode. The POS terminal first acquires the customer code (S10), and further acquires the goods code of the goods returned for recycle (S11). For example, the POS terminal reads the bar code reader 21 of the POS terminal 2, a customer's point card, and a bar code printed on the goods returned for recycle. Alternatively, the salesclerk inputs the customer code displayed on the point card, or the goods code displayed on the goods by the key board 23 of the POS terminal 2.

When the POS terminal 2 acquires the goods code, the POS terminal 2 refers to the goods database of the goods server 4, and judges whether or not the goods corresponding to the acquired goods code are recycle goods (S12). In the case where they are not the recycle targeting goods, an error is displayed on the display unit 22 of the POS terminal 2 (S13). In the case where they are the recycle targeting goods, the POS terminal 2 calculates the recycle points based on the unit price and recycle points ratio of the goods (S14).

The POS terminal 2 transmits the customer code and the calculated recycle points to the headquarters server 6 (S15). The headquarters server 6 adds the received recycle points to the recycle points in response to the customer code in the customer database, so that the headquarters server 6 renews the recycle points in the customer database, further total points (S16).

When the POS terminal receives a response for the renewal of the recycle points from the server, the POS terminal issues a receipt printing the updated recycle points and total points (S17), and returns to the normal sales processing.

Incidentally, the salesclerk carries the recycle goods received at the calculation location to the collection location of the recycle goods which is arranged in the store, or in the vicinity thereof, and the cycle goods are temporarily taken custody.

FIG. 7 is an example of a receipt according to the embodiment of the present invention. The receipt of FIG. 7 is an example in the case where the customer carries out a purchase of goods (a MO disk, a printer ribbon, a cleaner), and a recycle of goods (a personal computer monitor) in one time dealing. The receipt of FIG. 7 represents points for the purchase until the previous time, points for the purchase at this time, points for the recycle at this time, and total accumulative points.

In the case where the recycle payer is not a retail store itself, the amount of money in proportion to the recycle points restored to the customer is charged to the recycle payer, and also it is necessary to collect the returned recycle targeting goods.

Figures 8, 9:
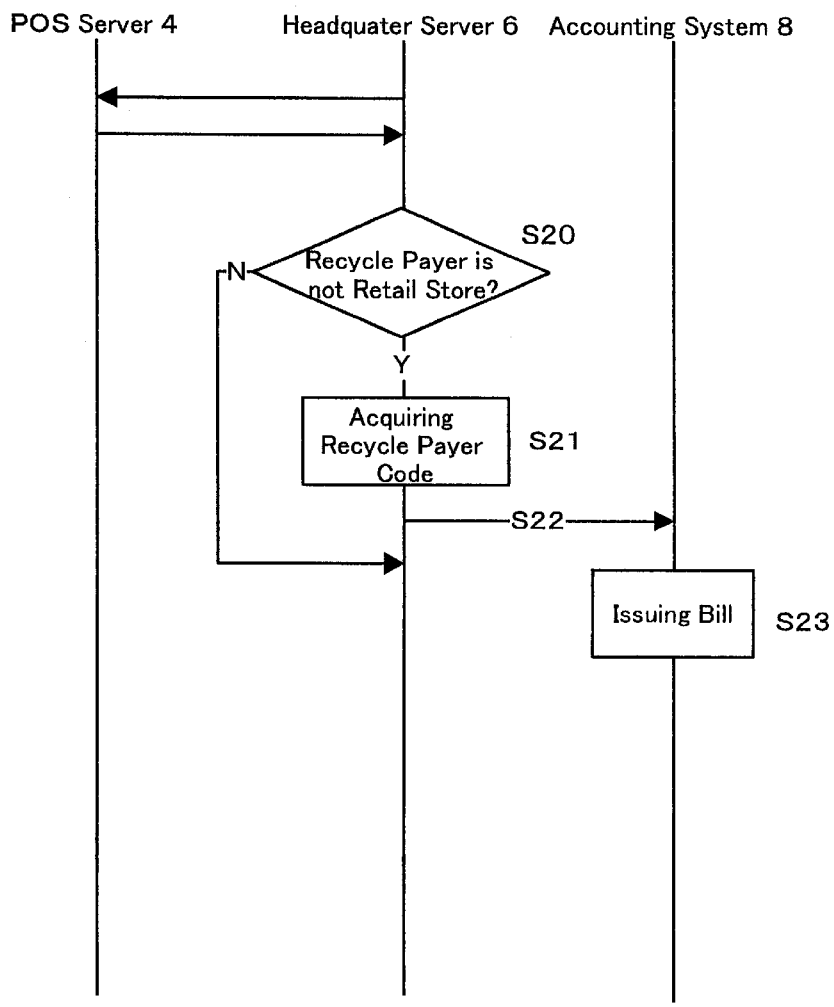
FIG. 8 is a claim processing of the recycle points.
FIG. 9 is an example of the recycle payer database.

FIG. 8 is a claim processing of the recycle points. This processing is executed by the headquarters server 6 based on the recycle calculation processing of FIG. 6. The headquarters server 6 refers to the goods database of the goods server 4 and judges whether or not the recycle payer of the recycle targeting goods is a retail store itself, together with the renewal processing of the customer database, by communication with the POS terminal 2 (S20). In the case where it is not the retail store itself, namely in the case where it is a supplier, or the like, the headquarters server 6 refers to the recycle payer database.

FIG. 9 is an example of the recycle payer database according to the embodiment of the present invention. The recycle payer database manages to each name of the recycle payer (a recycle payer code) the recycle targeting goods for which the recycle payer bears (a goods code), the recycle points in each of the recycle goods, the total recycle points, and the like.

Returning to FIG. 8, when the headquarters server 6 retrieves the recycle payer database from the goods code, and acquires the recycle payer code (S21), the headquarters server 6 transfers to the accounting system 8 information such as the acquired recycle payer code, the recycle points calculated at step S14 of FIG. 6, the goods code, the goods name, the quantity of goods, or the like (S22). The accounting system 8 is a computer system which executes a receipts and disbursements management, prepares bills, and the like for each daily deal in each retail store (sales, recycles), and is connected to the headquarters server 6. The accounting system 8 prepares the bills for charging the amount of money corresponding to the recycle points restored to the customers to the supplier in accordance with the information of the headquarters server 6 (S23). Incidentally, when the bill is prepared, the recycle points to be charged, or the like are subtracted from the payer database.

Figures 10, 11:
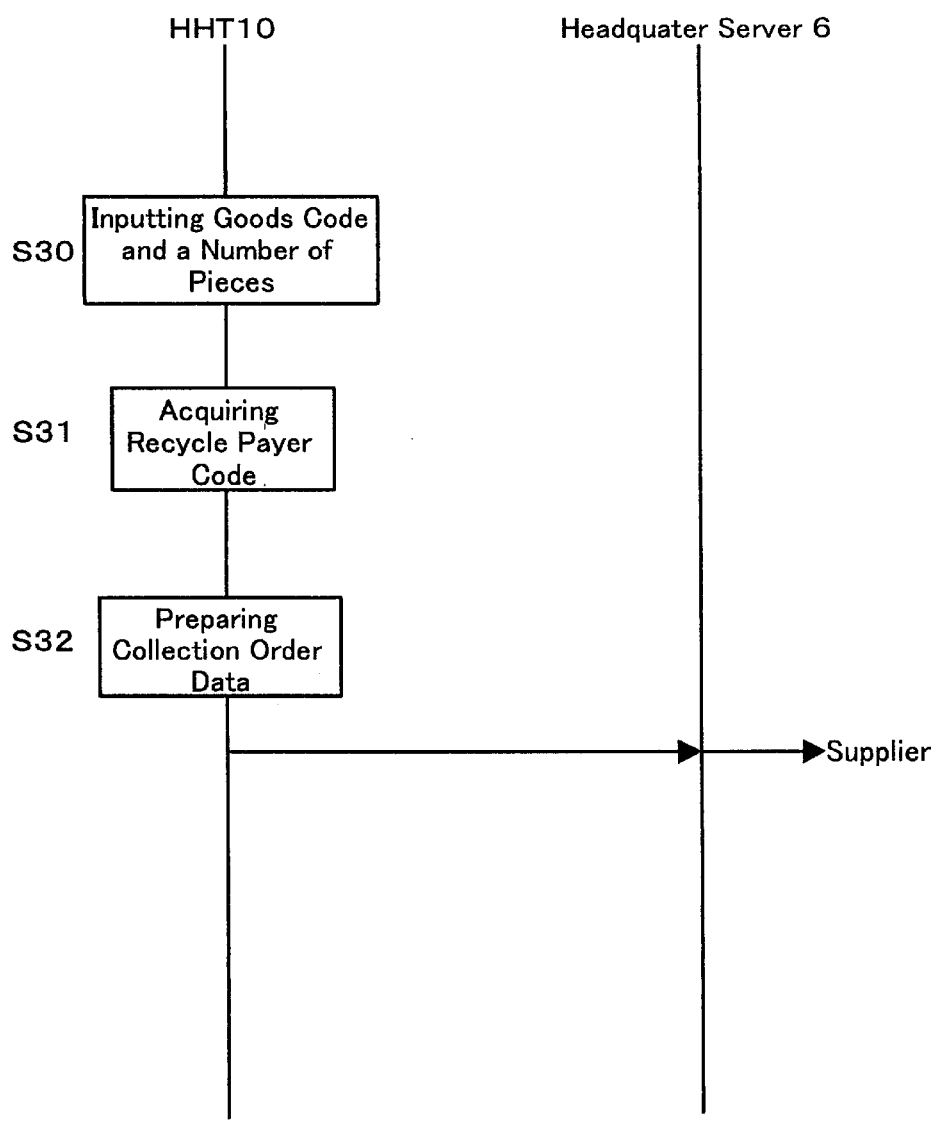
FIG. 10 is an example of a slip of a bill prepared by an accounting system.
FIG. 11 is a flowchart of a collection order.

FIG. 10 is an example of a slip of a bill prepared by the accounting system 8. In the bill of FIG. 10, in the case where 1 point of a recycle point is equivalent to ¥1, this example charges the recycle expenses ¥200 and transportation expenses of the returned recycle goods to the recycle payer. In the case where the recycle goods are collected by the recycle payer itself, the transportation expenses are justly unnecessary. The collection of the recycle goods by the recycle payer is made by the collection order from the retail store. It is efficient that this collection order is made, for example, at the time of order/delivery processing to each supplier. The collection order will further be explained in detail.

FIG. 11 is a flowchart of the collection order. The returned recycle targeting goods are stacked at the recycle collection locations arranged in the store of the retail store or in the vicinity thereof. The salesclerk generically utilizes the HHT (hand-held terminal) 10 for use in inspection of goods and stoke management, and periodically (for example, once a day after the retail store is closed) makes the collection order of the recycle targeting goods stacked at the collection locations to the recycle payer. Specifically, the above recycle payer database has been in advance loaded in the HHT. The salesclerk inputs to the HHT the goods code and the number of pieces to be collected in each of the recycle goods (S30). The HHT refers to the payer database, and acquires the recycle payer in response to the input goods code (S31), and prepares the collection order data in each of the recycle payers (S32).

The salesclerk connects the HHT 10 to the headquarters server 6, and the collection order data are transmitted to the computer system of the supplier via the headquarters server 6 (S33). The collection order data are transmitted together with the order data and delivery confirmation data prepared by the HHT 10. Incidentally, the HHT 10 is communicably connected to the predetermined computer system of each supplier for accepting the collection order system, and may transmit the collection order data to the computer system.

In the meantime, it is assumed that the recycle goods are carried in not to the calculation locations installing the POS terminal 2, but directly to the recycle collection locations by the customer. In such case, as the recycle processing such as the above recycle point calculation or the like cannot be performed by the POS terminal 2, the recycle processing is instead executed by exploiting the above HHT. The recycle processing exploiting the HHT will be explained below.

As explained in FIG. 1, the bar code label issuer (bar code labeler) 12 issues a label for discriminating the consumers and is installed in the collection locations. When the consumer carries in the recycle targeting goods to the collection location, first, the points card is read by the bar code labeler 12 to issue the label printing the bar code in response to the own customer code. The consumer has only to paste the issued label on the carried-in recycle targeting goods. Thereafter, when the salesclerk brings the HHT 10 to the collection location and circulates, the recycle points of the label pasted goods out of the stored recycle targeting goods are calculated by utilizing the HHT. Namely, the customer code is read from the label by a bar code scanner provided in the HHT 10. Furthermore, the goods code pasted on the recycle targeting goods is input to the HHT 10. Thus, the HHT 10 refers to the loaded goods database, thereby calculating the recycle points. The calculation results are temporarily held in the HHT 10.

When the calculation of the recycle points in each of the recycle targeting goods is ended, the salesclerk communicably connects the HHT 10 to the headquarters server 6, and transmits the recycle points in each customer code held in the HHT 10 to the headquarters server 6. The headquarters server 6 executes the renewal processing of the customer database in the same manner as in FIG. 5 as described above.

Furthermore, the recycle payer is not limited to the supplier of the recycle targeting goods, and may be, for example, an administrative organ, etc.

According to the embodiment of the present invention, the recycle managing system is constructed, and in such the recycle managing system, it is possible to make the recycle points restored to the consumers to bear the person other than the retail store such as the supplier, or the like in the returns of the recycle targeting goods. Thus, the bearing the expenses of the amount of money in proportion to the recycle points can be decreased for the retail store. Furthermore, thus, as it becomes possible to carry out the recycle activities more positively, it is possible to enhance an image of the retail store. Furthermore, as the supplier (manufacturer) can establish the process of manufacturing goods which are recycled for the returned recycle targeting goods, the supplier can obtain benefits for withdrawing the recycle targeting goods even by bearing the expenses for the recycle points. Thus, the recycle activities were conventionally independently carried out by the retail store, and are enlarged to activities containing the supplier, or the like by utilizing the recycle managing system according to the present invention, so that it can be expected that the recycle activities are accelerated.

Hereinabove, according to the present invention, in the case where the person other than the retail store bear the expenses the amount of money for the recycle points to be restored to the consumer in response to the returns of the recycle targeting goods, it is possible to manage the recycle points in each consumer, and additionally manage the recycle points in each of the recycle payers which pays the expenses for the recycle points. Thus, it becomes possible to manage the recycle activities by the three parties of the consumer, retail store, and supplier which enlarge the conventional recycle activities between the consumer and retail store.

The scope of protection of the present invention is not limited to the above embodiments but covers the invention defined in the appended claims and its equivalents.

What is claimed is:

1. A recycle managing system for managing recycle targeting goods which are returned from the customers to retail stores for a recycle, comprising:

a goods database registering goods information for sale including at least IDs and prices of goods, the database further recording information for discriminating whether or not goods are the recycle targeting ones, recycle points of the recycle targeting goods, and information of payers paying expense of the recycle targeting goods;

a calculator for calculating the recycle points equivalent to a monetary value with respect to returns of the recycle targeting goods based on the goods database;

a customer database for managing the recycle points of each customer of the retail store;

a payer database for managing the recycle points of each payer other than the retail store, which pays expenses equivalent to the recycle points; and a renewing unit for renewing the recycle points of the customer returning the recycle targeting goods based of the calculated recycle points in the customer database, and further renewing the recycle points of the payer paying the expenses for the recycle points of the returned recycle targeting goods based on the calculated recycle points in the payer database.

2. The recycle managing system according to claim 1, further comprising:

an accounting system for issuing a bill to each payer, the bill charging the expenses equivalent to the recycle points stored in the payer database.

3. The recycle managing system according to claim 1, wherein the recycle managing system is a terminal-server type POS system which is introduced to the retail store selling the recycle targeting goods, wherein the terminal has the calculator, and the server has the customer database, the payer database, and the renewing unit.

4. The recycle managing system according to claim 3, wherein the server further has goods database recording a unit price and a predetermined recycle ratio in each of the recycle targeting goods, and the terminal calculates the recycle points by multiplying the unit price by the recycle ratio.

5. The recycle managing system according to claim 3, wherein in the case where the customer presents a card storing a customer code to a salesclerk to return the recycle targeting goods, the terminal judges the customer returning the recycle targeting goods by reading the customer code stored in the card.

6. The recycle managing system according to claim 3, wherein in the case where the customer pastes a label storing the customer code on the recycle targeting goods to return the recycle targeting goods, the terminal judges the customer returning the recycle targeting goods by reading the customer code stored in the label.

7. A method for managing recycle targeting goods which are returned for a recycle from a customer to a retail store by utilizing a computer system, comprising the operations of:

a goods database registering goods information for sale including at least IDs and prices of goods, the database further recording information for discriminating whether or not goods are the recycle targeting ones, recycle points of the recycle targeting goods, and information of payers paying expense of the recycle targeting goods;

calculating recycle points equivalent to a monetary value with respect to returns of the recycle targeting goods based on the goods database;

preparing a customer database for managing the recycle points of each customer;

renewing the recycle points of the customer returning the recycle targeting goods based on the calculated recycle points in the customer database;

preparing a payer database for managing the recycle points of each payer paying expenses equivalent to the recycle points; and renewing the recycle points of the payer paying the expense for the recycle points of the returned recycle targeting goods based on the calculated recycle points in the payer database.

8. The method for managing recycle targeting goods according to claim 7, further comprising the operation of:

issuing a bill to each payer, the bill charging the expenses equivalent to the recycle points stored in the payer database.

9. The method for managing recycle targeting goods according to claim 7, further comprising the operation of:

preparing goods database recording a unit price and a predetermined recycle ratio in each of the recycle targeting goods, and calculating the recycle points by multiplying the unit price by the recycle ratio.

* * * * *